United States Patent
Schimpf

(10) Patent No.: US 9,199,841 B2
(45) Date of Patent: Dec. 1, 2015

(54) METHOD FOR DISENTANGLEMENT OF CARBON NANOTUBE BUNDLES

(75) Inventor: Warren C. Schimpf, Elkton, MD (US)

(73) Assignee: Advanced Fiber Technologies, Inc., Wilmington, DE (US)

( * ) Notice: Subject to any disclaimer, the term of this patent is extended or adjusted under 35 U.S.C. 154(b) by 1041 days.

(21) Appl. No.: 12/359,587

(22) Filed: Jan. 26, 2009

(65) Prior Publication Data

US 2010/0189628 A1 Jul. 29, 2010

(51) Int. Cl.
*D01F 9/12* (2006.01)
*B82B 3/00* (2006.01)

(52) U.S. Cl.
CPC .................... *B82B 3/0076* (2013.01)

(58) Field of Classification Search
CPC .................................................. B82B 3/0076
USPC ............... 423/447.1–447.3, 445 B, 460, 461;
977/742–754, 842–848; 428/367;
204/157.47; 427/249.1–249.9
See application file for complete search history.

(56) References Cited

U.S. PATENT DOCUMENTS

| | | | |
|---|---|---|---|
| 5,810,052 A * | 9/1998 | Kozyuk | 138/37 |
| 5,853,877 A | 12/1998 | Shibuta | |
| 5,971,601 A * | 10/1999 | Kozyuk | 366/176.1 |
| 6,709,471 B2 | 3/2004 | Miyamoto | |
| 6,783,476 B2 * | 8/2004 | Gleasman et al. | 475/227 |
| 6,783,746 B1 * | 8/2004 | Zhang et al. | 423/447.1 |
| 6,824,086 B1 * | 11/2004 | Mazurkiewicz et al. | 241/5 |
| 6,908,572 B1 * | 6/2005 | Derbyshire et al. | 252/502 |
| 7,207,712 B2 * | 4/2007 | Kozyuk | 366/341 |
| 2007/0189114 A1 * | 8/2007 | Reiner et al. | 366/176.2 |
| 2009/0134363 A1 * | 5/2009 | Bordere et al. | 252/511 |

FOREIGN PATENT DOCUMENTS

| | | | |
|---|---|---|---|
| JP | 2006-016222 | 1/2006 | |
| JP | 2006-150541 | * 6/2006 | B02B 3/00 |

OTHER PUBLICATIONS

Definition of "bundle," Merriam Webster Dictionary, accessed at: http://www.merriam-webster.com/dictionary/bundle on Mar. 8, 2012.*
Definition of "disentangle," Merriam Webster Dictionary, accessed at: http://www.merriam-webster.com/dictionary/disentangle on Mar. 8, 2012.*
Definition of "entanglement," Merriam Webster Dictionary, accessed at: http://www.merriam-webster.com/dictionary/entanglement on Mar. 11, 2012.*

(Continued)

*Primary Examiner* — Daniel C McCracken
(74) *Attorney, Agent, or Firm* — Novak Druce Connolly Bove + Quigg LLP

(57) ABSTRACT

Bundled carbon nanotubes are disentangled and dispersed using the principles of extreme pressure reduction of fluids carrying the bundled nanotubes. They are added to a high pressure fluid upstream of a chamber operated at much lower pressure. These high-low pressure ratios are preferably at least 100:1. As the high pressure fluid enters the lower pressure chamber it violently expands causing separation and disentanglement of the bundled carbon fibers. To further assist in this disentanglement a nozzle may be used at the inlet to the lower pressure chamber to direct the high pressure fluid against a hardened anvil in the chamber. This impact further aids disentanglement. Coating the nanotubes with a dispersant also improves disentanglement.

9 Claims, 1 Drawing Sheet

(56) References Cited

OTHER PUBLICATIONS

Definition of "entangle," Merriam Webster Dictionary, accessed at: http://www.merriam-webster.com/dictionary/entangled on Mar. 8, 2012.*

*Ex parte Eui-Sun Hong and Yoon-Tai Kwak*, Appeal 2011-009500, U.S. Appl. No. 11/211,134, mailed on Dec. 24, 2012.*
S.V. Ahir, Y.Y. Huang, E.M. Terentjev; Polymer; Elsevier; May 10, 2008; Polymer 49 (2008) 3841-3854.

* cited by examiner

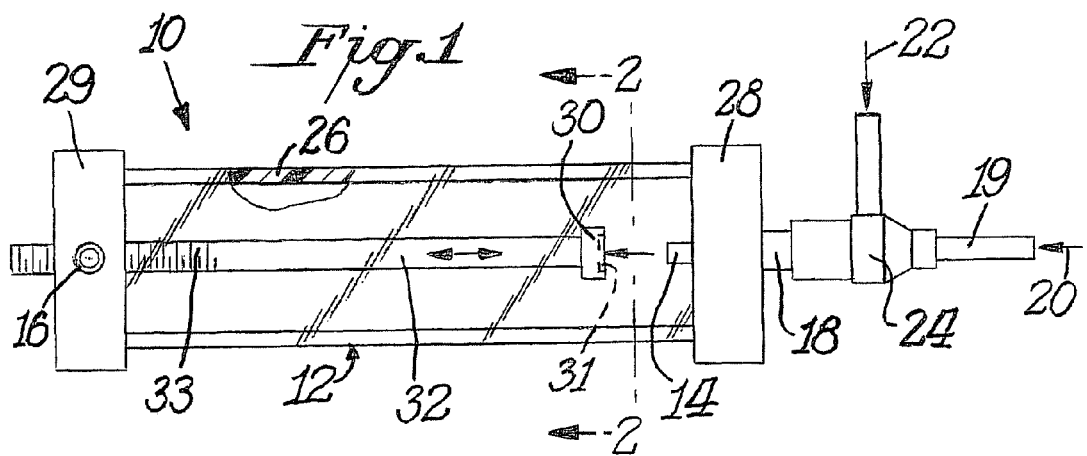
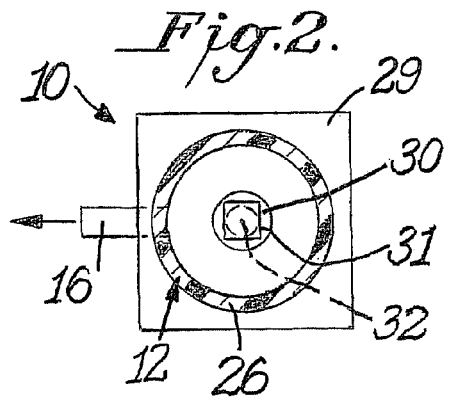

METHOD FOR DISENTANGLEMENT OF CARBON NANOTUBE BUNDLES

STATEMENT REGARDING FEDERALLY SPONSORED RESEARCH OR DEVELOPMENT

This invention was made with U.S. Government support under contract No. HR0011-06-C-01 awarded by DARPA (NGSCF). The Government has certain rights in the invention.

BACKGROUND OF THE INVENTION

Disentangling nanotube bundles is important to the efficient use of nanotubes, particularly carbon nanotubes (CNTs). Nanotubes have numerous commercial applications. The unique electrical properties of single wall carbon nanotubes, particularly in the axial direction (excellent electrical conductivity) have opened up uses and potential uses in computers, for example, where significant increases in computing power with decreases in physical size, are being developed. Similarly, improved flexible displays for televisions and computers are being developed with the incorporation of nanotube materials. In medical applications, they have been proposed for use as medical delivery vehicles. However, it is the unusually high mechanical properties (strength and modulus) that have attracted the most interest for nanotube applications. Someday ultra strong carbon nanotubes may be the foundation of a space elevator while their use as reinforcements in composites promises to revolutionize the properties of composite materials. Already, the incorporation of nanotubes in composite systems has lead to significant improvements in composite toughness, strength, stiffness, and conductivity in many laboratories. Commercially, these composite materials have already found limited use in sporting goods (tennis rackets, bicycles, golf clubs), automotive (fuel lines, body parts), and aerospace applications. The difficulty in achieving adequate disentanglement and dispersion currently limits their use in additional applications.

As in any composite material, in a nanotube reinforced composite at least one constituent serves the purpose of providing the reinforcement (nanotubes) while another constituent (e.g. polymeric matrix) serves the purpose of transferring the load between individual reinforcing entities. In order to achieve this reinforcement, it is necessary to maximize the amount of nanotube surface area in direct contact with the material it is reinforcing and to disperse the nanotubes as uniformly as possible throughout the matrix. The nanotube reinforced composites ("NRC") may include matrix resins such as epoxies, polyesters, polyimides, polyamides, and the like.

The greater the surface area in contact with the material being reinforced and the more uniform the distribution of nanotubes within the material the stronger the composite. However, nanotubes are typically produced in a manner whereby they are not single strands but rather tangled bundles. In the case of single wall nanotubes (SWNTs), the nanotubes are produced as bundles of ropes, caused in part by very strong van der Waals forces. In addition, the high aspect ratios of the carbon nanotubes make it difficult to separate them into individual ropes or tubes. As produced in bundles, the nanotubes offer lowered surface area per unit of weight available for adherence to the material being reinforced. In addition, highly entangled bundles can lead to the nanotubes acting as stress concentrators instead of reinforcements, thus degrading the mechanical properties of the NRC. In other applications, e.g. where nanotubes are incorporated to produce a conductive polymer, adequate dispersibility is required to obtain the continuous and uniform conductivity required throughout the composite. Thus, there is a need for methods to disentangle nanotube bundles into deagglomerated ropes or individual nanotubes.

As discussed in more detail in the next section applicant has found that large pressure differentials create an environment that will separate the bundled nanotubes. More particularly, applicant has found that placing the entangled nanotubes in a high pressure waterjet that is allowed to expand into a zone of lower pressures introduces enough force to disentangle the nanotube bundles without adversely affecting their structure.

The available abstract of Japanese Patent Application Publication No. 150541 ("'541 Application") entitled "Method for Rupturing Carbon Nanotube and [Resulting] Carbon Nanotube" discloses a method for "rupturing carbon nanotubes" but does not disclose disentanglement of nanotubes. The device disclosed in this abstract and, to the limited extent understood, the specification of the '541 Application facilitates this rupturing or breakage of carbon nanotubes by directing multiple streams of water containing nanotubes at each other. These water/nanotube streams are directed through "complicated flow passages of fine tubes." According to the abstract of the '541 Application, the collision of these streams with each other as they exit the fine tubes and the boundaries of the chamber into which they flow ruptures or breaks the nanotubes. This object of the '541 Application is unlike Applicant's object, namely to debundle and separate the nanotubes to improve their utility, particularly as a reinforcement in composite materials.

A companion Japanese Patent Application Publication No. 2006-016222 ("'222 Application") discloses a device similar to that of the '541 Application for "rupturing" or breaking nanotubes. The primary differences between these two Japanese Applications relate to the structure of the "complicated flow passages" within the devices carrying the water borne nanotubes before they exit the passages and collide. FIG. 2 of the '222 Application schematically illustrates multiple very high pressure (175,000 psi) water streams 14 and 16 which merge as stream 28 after collision and exit the device at discharge port 30. To get the desired degree of rupturing the exit stream for port 30 is split and recycled 10-20 times. There is no disclosure in the '222 Application of any process or means for disentangling nanotubes.

SUMMARY OF THE INVENTION

Improved disentanglement and dispersibility of carbon nanotubes is achieved by this invention relative to other methods currently in use. This is achieved by introducing the bundled nanotubes needing separation into a high pressure fluid stream. This combination of the bundled nanotubes with the high pressure fluid, typically water, is then introduced into a closed chamber operating at a much lower pressure. The sudden reduction in pressure creates cavitation with the formation and sudden collapse of bubbles in the liquid. The collapse generates ultra high energy shock waves, which can then perform work on the water/nanotube mixture and also causes violent movement of the water/nanotube mixture. It has been shown that the energy generated by that work separates the bundled nanotubes.

To further assist the disentanglement of nanotubes entering the lower pressure chamber, the high pressure fluid stream enters that chamber through a nozzle at the entrance to the chamber. This nozzle can then direct the entering stream against an anvil spaced in the chamber close to the nozzle. The high pressure stream entering the chamber is traveling at a very high speed as it enters the lower pressure in the chamber. It then impacts upon the anvil adding further force to disentangle the nanotubes.

The disentangled nanotubes collect in the fluid, usually water, within the closed chamber, and exit through an outlet in the chamber for collection and use.

BRIEF DESCRIPTION OF THE DRAWINGS

FIG. 1 is a side elevational view in partial cutaway of the chamber used to disentangle nanotubes in accordance with this invention.

FIG. 2 is a cross sectional view of the chamber along lines 2-2 of FIG. 1.

DETAILED DESCRIPTION OF THE INVENTION

The present invention is directed at processes to disentangle nanotube bundles. It does not have as an object the fracturing or breaking the nanotubes such as is the case with the aforementioned Japanese Published Applications. In fact, in many applications, e.g., reinforcement of composites, the fracturing (shortening) of nanotubes would be antithetical to the application. In any fiber reinforced composite, there is a critical length that the fibers must have to strengthen a material to their maximum ability. This critical length can be mathematically derived from the mechanical and physical properties of the fiber. If the reinforcing fiber (nanotube in this case) falls below this critical length, the reinforcing effect will be minimal or nonexistent. Coupled with this is the fact that the longer the nanotube the greater is the reinforcement potential for the nanotube because it has greater surface area per unit of length adhering to the composite material. In conjunction with the need to exceed a critical length, reinforcing elements (e.g. nanotubes) must be well and uniformly dispersed through the composite to realize the optimum properties. There are two general classes of carbon nanotube materials, single wall (SWNTs) and multi wall (MWNTs). In the case of SWNTs, the individual nanotubes are attracted to each other during formation by strong inter-wall interactions, leading to the formation of "ropes" of SWNTs. MWNTs do not form ropes, per se, but in both cases, the resultant nanotubes typically entangle during formation and the strong van der Waals forces make it very difficult to separate the ropes and/or nanotubes.

Disentanglement is an important factor in obtaining greater surface area of the nanotube in whatever application they might be used. Most applications for nanotubes rely on and require the small size of nanotubes, so large bundles are counterproductive. Also, in order to realize the extremely high mechanical and electrical properties of CNTs in any application, high levels of disentanglement are required. For example, in medical applications under development, where nanotubes might be used for drug delivery to remote parts of the body, bundles of entangled CNTs will not work. In electronic applications, such as future computer or other displays, or for use in fuel cells or other energy storage devices, significantly higher electrical efficiencies will be realized by single disentangled CNTs. Disentanglement allows the nanotubes to individually disperse into the surrounding medium, whether a composite matrix or other application. As an added benefit, because nanotubes are currently so expensive to make, debundling and/or disentanglement can save money because fewer nanotubes are required in a particular application.

Others have tried to achieve the difficult task of disentanglement using chemical surface treatment, for example, as described in U.S. Pat. No. 5,853,877. This approach is complicated and not always successful. It can also limit the use of the resulting nanotubes by causing surface degradation and fracture. Others have used ball milling to disentangle CNTs but this leads to nanotube fracture. Still others use sonication techniques but this is inefficient and time consuming. For example, Applicant's approach has shown significant time savings over sonication techniques.

Applicant has taken a totally different approach to debundling/disentanglement. More specifically, the applicant utilizes the tremendous forces associated with high pressure mixing and depressurization (cavitation) to achieve the desired separation of the nanotubes, one from the other. One device for achieving this separation associated with depressurization is illustrated in FIG. 1. This disentanglement device 10 includes a sealed chamber 12 with fluid inlet 14 and outlet 16. Chamber inlet 14 is preferably equipped with a 0.020-0.030 inch diameter nozzle opening to direct and control flow into chamber 12. Chamber 12 is in fluid communication thru conduit 18, 19 with a source of fluid 20, preferably water, under high pressure. Bundled nanotubes to be disentangled are drawn into mixing tube 24 and conduit 18, at inlet 22 so that they admix with the high pressure fluid stream in mixing tube 24 and conduit 18. The passage of the high pressure fluid through conduits 18, 19 creates a venturi type effect in mixing tube 24 which draws them into and thru conduit 18, and then to inlet 14.

The mixing tube 24 operates as follows: the high pressure fluid in conduits 18, 19 is obtained using, for example, a KMT Waterjet System. The inside diameter of conduit 19 can be, for example, 0.010 inch contributing to the high pressure in that conduit. The fluid exits conduit 19 into mixing tube 24 where it mixes with the CNTs and enters conduit 18, with an inside diameter, for example, of about 0.020 to 0.030 inches, before exiting nozzle 14 into chamber 12. The high pressure in these conduits ranges from 30,000-40,000 psi for best results, although lower pressures (above ~5000 psi) may be used. The best pressure for the fluid entering chamber 12 is, in part, a function of the pressure within chamber 12 because the pressure differential between the fluid exiting the nozzle in inlet 14 and that inside chamber 12 controls the disentanglement of the bundled nanotubes. Preferably, a high pressure differential, in conjunction with a high internal pressure in chamber 12, will yield the highest degree of turbulence. Typically, this pressure ratio is over 300:1 but lower ratios, e.g. 80-100:1, can be used. Tables 1 and 2 below provide more detail on experimental pressure differences between the chamber 12 and the inlet 14. Pressure within the chamber 12 typically ranges from 80-100 psi but higher pressures (300-400 psi or higher) can be used provided the necessary ratio of inlet pressure to chamber pressure is maintained and the chamber 12 material construction can withstand the pressures.

The desired operating pressure in chamber 12 is controlled by an outlet flow control valve at outlet 16. This valve can be a manual valve regulated to maintain a certain pressure in chamber 12 or an automatic valve set to maintain a certain pressure in chamber 12. Pressure in chamber 12 could also be maintained at a certain pressure, for example, by controlling outlet 16 at a certain orifice diameter.

Chamber 12 can be constructed of any materials that can withstand the operating pressures therein. The chamber 12 illustrated in FIGS. 1 and 2 comprises a thick plastic wall tube 26 held between end pieces 28, 29. The end pieces 28, 29 preferably have circular grooves and gaskets therein (not shown) for sealing engagement with the plastic tube 26. The plastic tube 26 is preferably of a substantial wall thickness, for example, ¼ to ½ inch to withstand the pressures in, and entering, chamber 12, up to the maximum working pressure of plastic tube 26. For higher pressures, alternative materials of construction, for example aluminum or steel, for tube 26 can be used.

In a preferred embodiment of the disentanglement device 10 an anvil 30 is adjustably mounted in chamber 12 so that it is aligned with the high pressure fluid containing bundled nanotubes exiting the nozzle in inlet 14. The anvil 30 is preferably constructed to receive hardened inserts 31 that can be replaced as they get worn away due to the impact of the high pressure fluid impinging on the inserts. A carbide insert about ¾ to 1 inch square has been found to provide good wear resistance under the impact of the high pressure fluid exiting the nozzle in inlet 14.

The anvil 30 is preferably mounted on an adjustable support 32. In one embodiment illustrated in FIG. 1 this support 32 is a rod with screw threads 33 along all or part of its length which mate with corresponding screw threads 33 in end piece 29. Rotation of support 32 enables adjustment of the distance between inlet 14 and anvil 30. The degree of adjustment can be altered by changing the pitch and distance of the mating screw threads on support 32 and end piece 29.

The disentanglement device 10 operates as follows. Fluid under pressure (~10-40,000 psi) is introduced into fluid conduit 20. That fluid, typically water, passes through conduit 19 (typically ~0.010 inch diameter), exiting into mixing tube 24, and then entering conduit 18 on its way to inlet 14. After exiting the (typically 0.020-0.030 inch diameter) nozzle at inlet 14 the fluid violently and rapidly expands creating vapor bubbles as it enters the lower pressure inside chamber 12. As the water builds up in chamber 12 it slowly exits through a control valve or orifice at outlet 16. Outlet 16 preferably is equipped with a valve to control the pressure in chamber 12 and the rate at which fluid exits chamber 12. Back pressure of about 80-100 psi is maintained within chamber 12 by controlling the exit of fluid from the chamber 12 via the valve or orifice in outlet 16. Once the desired pressure is achieved in chamber 12, bundled nanotubes sought to be disentangled are delivered to conduit 22, preferably in a liquid medium. These nanotubes are drawn into the chamber 12 via inlet 14 by the venturi effect of the high pressure fluid passing through conduits 19 and 18.

When the bundled nanotubes in the high pressure fluid passing thru conduit 18 enter chamber 12 through the nozzle in inlet 14 the fluid rapidly expands because of the substantially lower pressure in chamber 12. The pressure in chamber 12 is preferably 1% or less of the pressure at inlet 14. This rapid and substantial reduction in pressure causes the water to begin to vaporize, resulting in the formation of vapor bubbles in the fluid in chamber 12. The pressure and turbulence in chamber 12 then cause these bubbles to rapidly collapse or implode, resulting in the generation of strong and significant shock waves in chamber 12. The shock waves can cause the velocity of the liquid to locally exceed the speed of sound, resulting in very high energies in chamber 12. These energies then work to disentangle the bundled nanotubes. This disentanglement is also facilitated by the impact of the fluid stream exiting inlet 14 upon anvil 30 and more particularly upon the hardened insert 31. As the nanotube bundles in this fluid stream hit the hardened insert 31 they separate one from the other to further assist in their disentanglement.

To further assist disentanglement, the bundled nanotubes can be treated with a dispersing agent, for example, a solution of water and polyvinylpyrrolidone (PVP). Multiple passes through chamber 12 can be also used to enhance disentanglement.

The invention will now be described in further detail with reference to the following non-limiting examples.

EXAMPLE 1

Three groups of multiple wall nanotubes were prepared for disentanglement. Two were treated with a commercially available chemical dispersant and one without. Twelve samples were made from the three groups of materials. Six of the twelve samples were treated with the impact anvil in place and six without. Water pressures were 30,000 psi while back pressure in chamber 12 was maintained at 80-100 psi, leading to significant energy transfer to the nanotubes.

The treated dispersions appeared to stay well disentangled after treatment in chamber 12, the degree of disentanglement dependent on the exact processing conditions and feed materials. Table 1 summarizes the testing methodology and results. As shown in this Table, three starting nanotube samples were analyzed, all at an initial weight of 0.375 g. Two of those samples (samples R-20-179-1 and R-20-179-2) were pretreated with a dispersing agent prior to introduction into chamber 12. The third sample (R20-179-3) was not pretreated. The Table shows the other variables (pressures, number of passes through chamber 12, use of anvil) tested regarding their relative contribution to disentanglement.

After processing, great care is taken to collect all of the nanotubes sample from each run. The degree of disentanglement achieved is determined by the volume of the nanotubes after processing. The larger their volume after processing, relative to their volume before processing, the greater is the disentanglement. This volume is measured by simply pouring the treated and control nanotubes into separate jars and observing the level of the nanotubes within the jar. The higher the level of the nanotubes in the jar the greater is the disentanglement of the nanotubes. This relative volume of treated nanotubes, as measured in the jar, is accorded a scale of 1-5 with 5 being the largest volume increase relative to the untreated nanotubes in water. This is not meant to represent a linear scale to compare increases in volume between samples but is meant to signify a semi-quantitative comparison in volume for untreated samples versus treated samples as well as providing a rough measure for samples processed in different ways.

The data in Table 1 shows that with a single pass through chamber 12, without using anvil 30 (Sample Run No. 1), the relative volume of disentangled nanotubes versus the control is "2," i.e., the initial volume of untreated nanotubes was noticeably greater after treatment in chamber 12. After another pass through chamber 12 the relative volume of Sample Run 1 increased noticeably again as shown in the line marked Sample Run No. 2. The use of the anvil 30 again increases the relative volume, and disentanglement, of the nanotubes as shown by the relative volume readings in the right column of Table 1 for Sample Run No. 8.

The relative volume, and therefore degree of disentanglement, is also affected by treatment with a dispersing agent. The amount and effectiveness of the dispersing agent used will affect the relative volume change even before treatment in chamber 12 as illustrated by a comparison of the relative volumes (degree of disbursement) for Control Sample No. 1 (R20-179-1) with minimal dispersing agent versus Control Sample No. 2 (R20-179-2) with maximum dispersing agent. The latter produced larger relative volume than the former. Each of these Control Samples had a larger relative volume than Control Sample No. 3 (R20-179-3) which was not treated with a dispersing agent.

transfer to glass jars. There has been no indication that the treated samples will settle any more over time.

TABLE 1

Starting Samples:
R20-179-1 —MWNT and water with minimal dispersing agent
R20-179-2 —MWNT and water with maximum dispersing agent
R20-179-3 —MWNT and water w/o dispersing agent

| Sample Run # | MWNT Feedstock Desig. (R20-) | Feed Water Pressure (ksi) | Chamber 12 Back Pressure (psi) | Number Passes Through Chamber | Anvil Used Cell ? | Relative Volume Change After Treatment (0 = least; 5 = greatest) |
|---|---|---|---|---|---|---|
| Control No. 1 | 179-1 | none | — | — | — | 1 |
| Control No. 2 | 179-2 | none | — | — | — | 2 |
| Control No. 3 | 179-3 | none | — | — | — | 0 |
| 1 | 179-1 | 30 | ~80-100 | 1 | No | 2 |
| 2 | Sample 1 | 30 | ~80-100 | 2 | No | 3 |
| 3 | 179-2 | 30 | ~80-100 | 1 | Yes; anvil ⅞" from nozzle 14 | 5 |
| 4 | Sample 3 | 30 | ~80-100 | 2 | Yes; anvil ⅞" from nozzle 14 | 5 |
| 5 | 179-3 | 30 | ~80-100 | 1 | Yes; anvil ⅞" from nozzle 14 | 2 |
| 6 | Sample 5 | 30 | ~80-100 | 2 | Yes; anvil ⅞" from nozzle 14 | 3 |
| 7 | 179-1 | 30 | ~80-100 | 1 | Yes; anvil ⅞" from nozzle 14 | 3 |
| 8 | Sample 7 | 30 | ~80-100 | 2 | Yes; anvil ⅞" from nozzle 14 | 4 |
| 9 | 179-2 | 30 | ~80-100 | 1 | No | 5 |
| 10 | Sample 9 | 30 | ~80-100 | 2 | No | 5 |
| 11 | 179-3 | 30 | ~80-100 | 1 | No | 1 |
| 12 | Sample 11 | 30 | ~80-100 | 2 | No | 2 |

EXAMPLE 2

Table 2 contains the processing conditions and relative volumes of three samples of single wall nanotubes (SWNTs) that were prepared for disentanglement. This Table illustrates the effects of different feed pressures and number of passes on SWNT dispersion. Evaluation of the resulting products was done visually, i.e. volume change after settling in water after the various treatments. Volume change correlates to CNT disentanglement as the disentangled nanotubes can no longer pack as efficiently in a given volume once the bundles separate.

All three samples were treated with the impact anvil in place. Table 2 shows the relative volume change of 5 grams of SWNTs after treatment at 30 ksi water feed pressure and passes through the chamber compared to an untreated sample. The samples were allowed to settle for over three days after This Table also illustrates the effect of pressure differentials on disentanglement. The Table shows that Sample 53-2, using a higher initial feed pressure than Sample 53-1, occupies more volume than the latter, indicating a greater degree of disentanglement of the SWNTs.

TABLE 2

| Sample Designation R21- | Weight SWNTs (g) | Feed Water Pressure (ksi) | Chamber 12 Back Pressure (psi) | Number Passes Through Chamber | Anvil Used? | Relative Volume Change After Treatment (0 = least; 5 = greatest) |
|---|---|---|---|---|---|---|
| 53-8 | 5 | none (control) | — | none | — | 0 |
| 53-4E | 5 | 30 | 110-140 | 5 | yes | 5 |
| 53-1 | 10 | 8 | 110-150 | 1 | yes | 3 |
| 53-2 | 10 | 30 | 120-150 | 1 | yes | 5 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed as new and desired to be protected by Letters Patent of the United States is:

1. A process for disentangling tangled bundles of nanotubes comprising:

a) introducing the tangled bundles of nanotubes into a high pressure liquid stream maintained at a pressure of at least about 5000 psi;
b) introducing the high pressure liquid stream containing the tangled bundles of nanotubes into a chamber maintained at a substantially lower pressure than the liquid stream, whereby the pressure differential between the pressure of the high pressure liquid stream and the pressure in the chamber is maintained at a ratio of about at least 60:1 to disentangle at least a portion of the tangled bundles of nanotubes;
c) withdrawing the disentangled nanotubes and liquid from the chamber.

2. The process of claim 1 wherein the high pressure liquid stream, before entering the chamber, is maintained at a pressure of at least about 8,000 pounds per square inch.

3. The process of claim 1 wherein the pressure ratio between the high pressure liquid stream and low pressure chamber is sufficient to cause cavitation of the fluid in the chamber.

4. The process of claim 3 wherein the pressure ratio of the high pressure liquid stream to the lower pressure in the chamber is at least 100:1.

5. The process of claim 1 wherein the high pressure liquid stream entering the chamber impinges upon an adjustable anvil within the chamber.

6. The process of claim 5 wherein the force imparted on the anvil by the high pressure liquid stream can be modified by movement of the adjustable anvil within the chamber.

7. The process of claim 5 wherein the anvil contains hardened inserts at least on the surface upon which the high pressure stream impinges.

8. The process of claim 1 wherein the disentangled nanotubes are withdrawn through an outlet port in the chamber.

9. The process of claim 1 wherein the tangled bundles of nanotubes are coated with a dispersing agent before introducing them into the high pressure liquid stream.

* * * * *